I. HULTMAN.
SHEARS FOR CUTTING SHEET METAL, WIRE, BOLTS, &c.
APPLICATION FILED NOV. 23, 1917.

1,354,755.

Patented Oct. 5, 1920.
6 SHEETS—SHEET 1.

Inventor:
Ivar Hultman
by B. Singer
Attorney.

I. HULTMAN.
SHEARS FOR CUTTING SHEET METAL, WIRE, BOLTS, &c.
APPLICATION FILED NOV. 23, 1917.
1,354,755.
Patented Oct. 5, 1920.
6 SHEETS—SHEET 2.
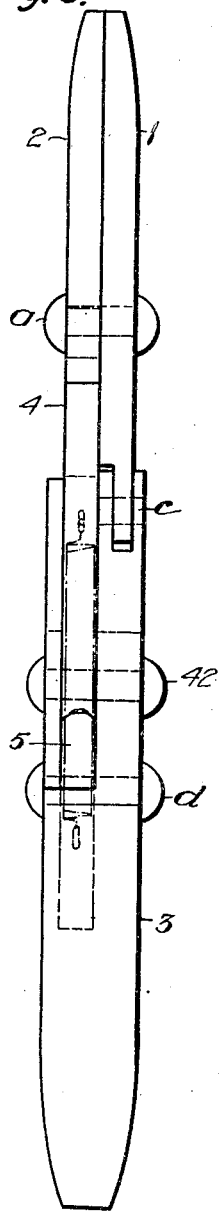
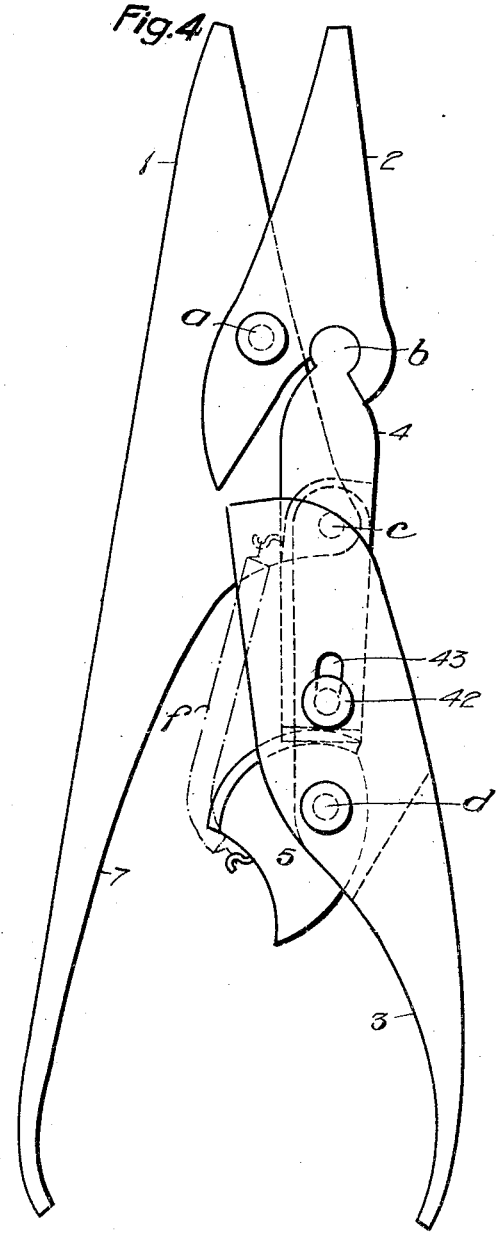

I. HULTMAN.
SHEARS FOR CUTTING SHEET METAL, WIRE, BOLTS, &c.
APPLICATION FILED NOV. 23, 1917.
1,354,755.
Patented Oct. 5, 1920.
6 SHEETS—SHEET 3.
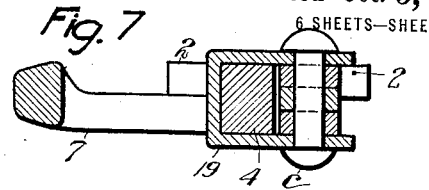
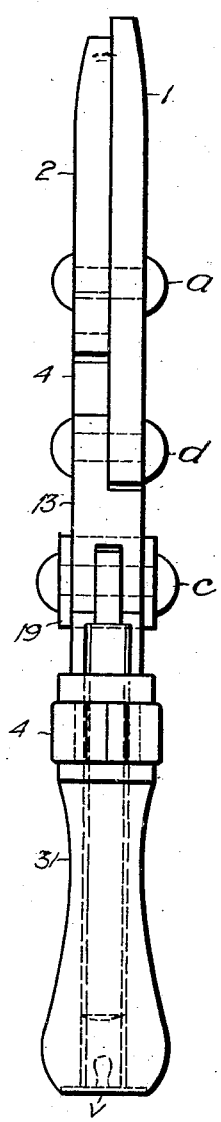
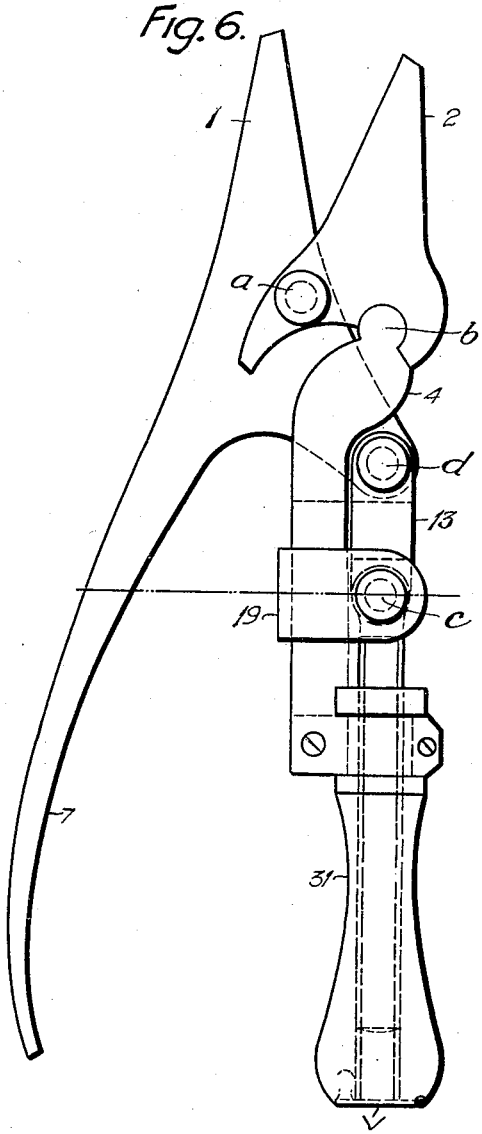

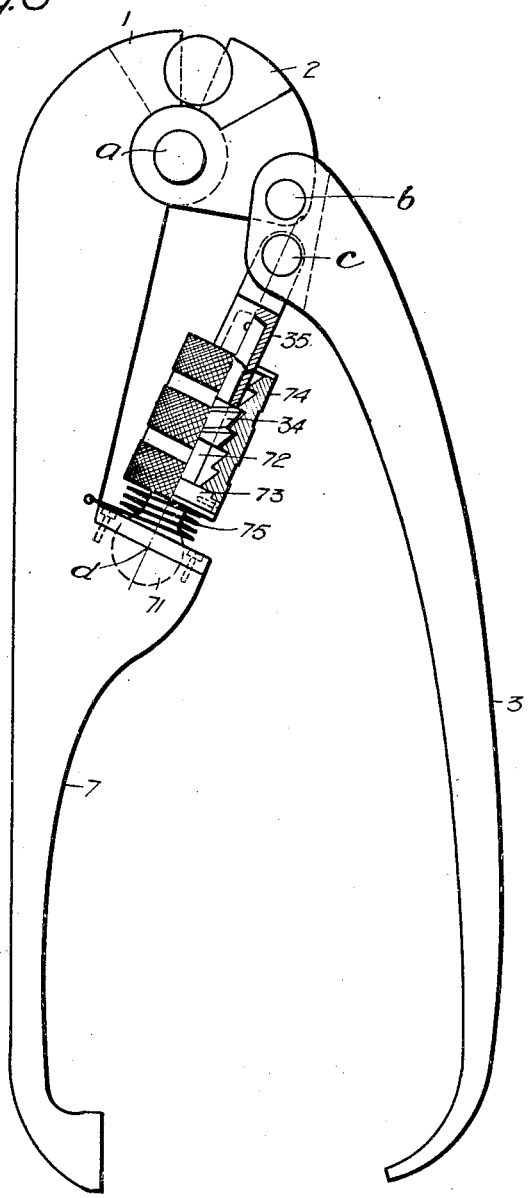

I. HULTMAN.
SHEARS FOR CUTTING SHEET METAL, WIRE, BOLTS, &c.
APPLICATION FILED NOV. 23, 1917.
1,354,755.
Patented Oct. 5, 1920.
6 SHEETS—SHEET 5.
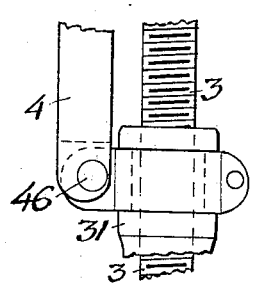
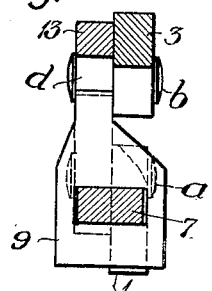
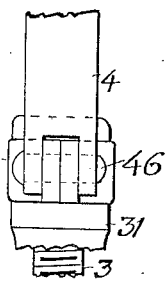
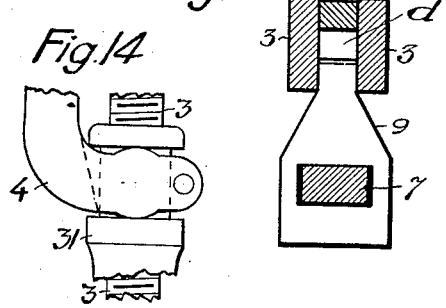
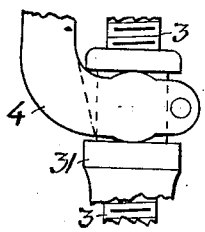
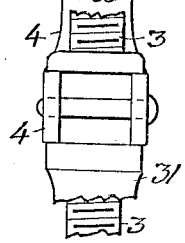
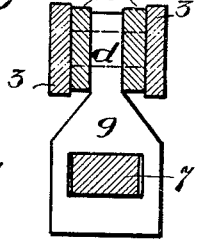
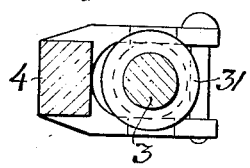
Inventor:
Ivar Hultman
by B. Singer
Attorney.

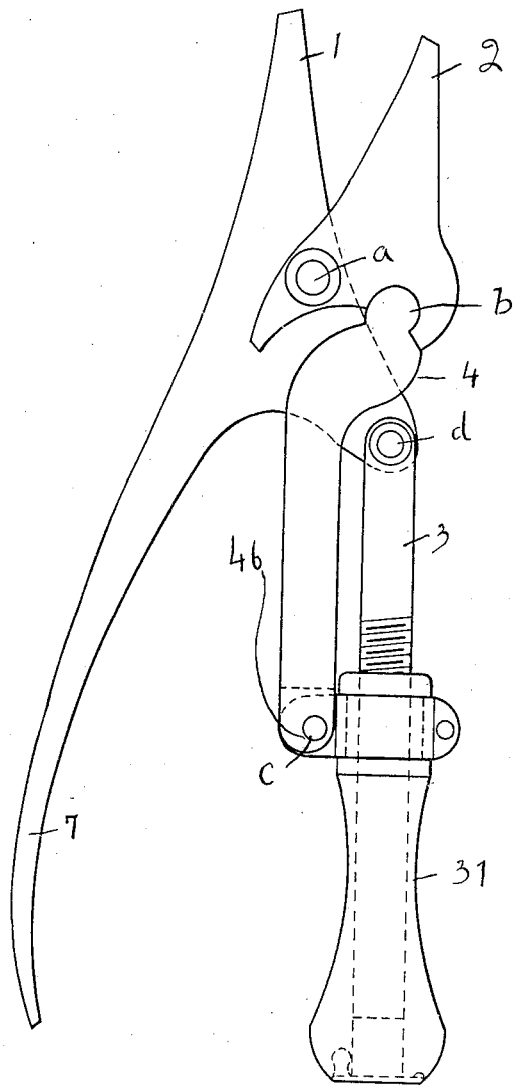

UNITED STATES PATENT OFFICE.

IVAR HULTMAN, OF NEGLINGE, SALTSJÖBADEN, NEAR STOCKHOLM, SWEDEN.

SHEARS FOR CUTTING SHEET METAL, WIRE, BOLTS, &c.

1,354,755. Specification of Letters Patent. Patented Oct. 5, 1920.

Application filed November 23, 1917. Serial No. 203,582.

*To whom it may concern:*

Be it known that I, IVAR HULTMAN, a subject of the King of Sweden, residing at Neglinge, Saltsjöbaden, near Stockholm, in the Kingdom of Sweden, have invented a new and useful Shears for Cutting Sheet Metal, Wire, Bolts, &c., of which the following is a specification.

This invention has for its object to essentially increase the cutting power of shears so as to enable one to cut even thick sheet metal and bolts or the like by means of hand-shears.

As set forth in my previous patent application No. 132418 I attain such results by using a kind of toggle mechanism which strongly increases the leverage and which works in such a manner that one of the two jaws, which is pivoted to its shank or handle, will slowly and successively turn to its closed position when the handles are repeatedly closed and opened.

My said previous application shows and describes two embodiments of such shears.

The present application covers further embodiments of shears built on the same principle.

On the drawings, which show examples,

Figures 1 and 2 are plan view and side view of one form.

Figs. 3 and 4 plan view and side view of a second form,

Figs. 5, 6, 7 plan view, side view and cross section of a third form,

Fig. 8 side view of a fourth form,

Figs. 9 and 10 show cross sections of other variations,

Fig. 11 discloses a detail view of an optional construction.

Fig. 12 is a detail view of an adjusting mechanism.

Fig. 13 is a view similar to Fig. 12 but being a front elevation.

Fig. 14 is a side elevation of an optional construction of the adjusting nut.

Fig. 15 is a rear view thereof.

Fig. 16 is a plan view on the same figure.

Fig. 17 is a side elevation of a pair of pliers constructed according to my invention.

In the following specification and claims the words upper, lower, front, rear, etc., refer to the position of the shear when in use.

Figure 1:
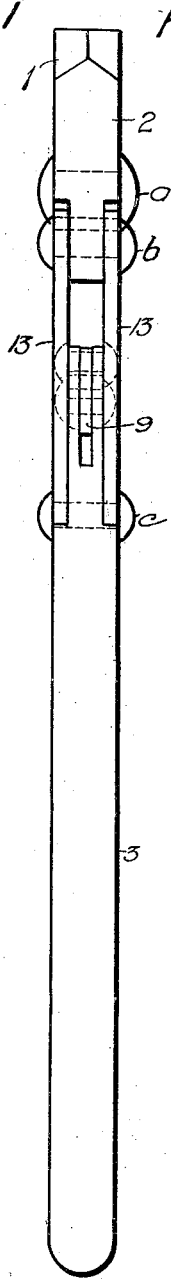
Figure 2:
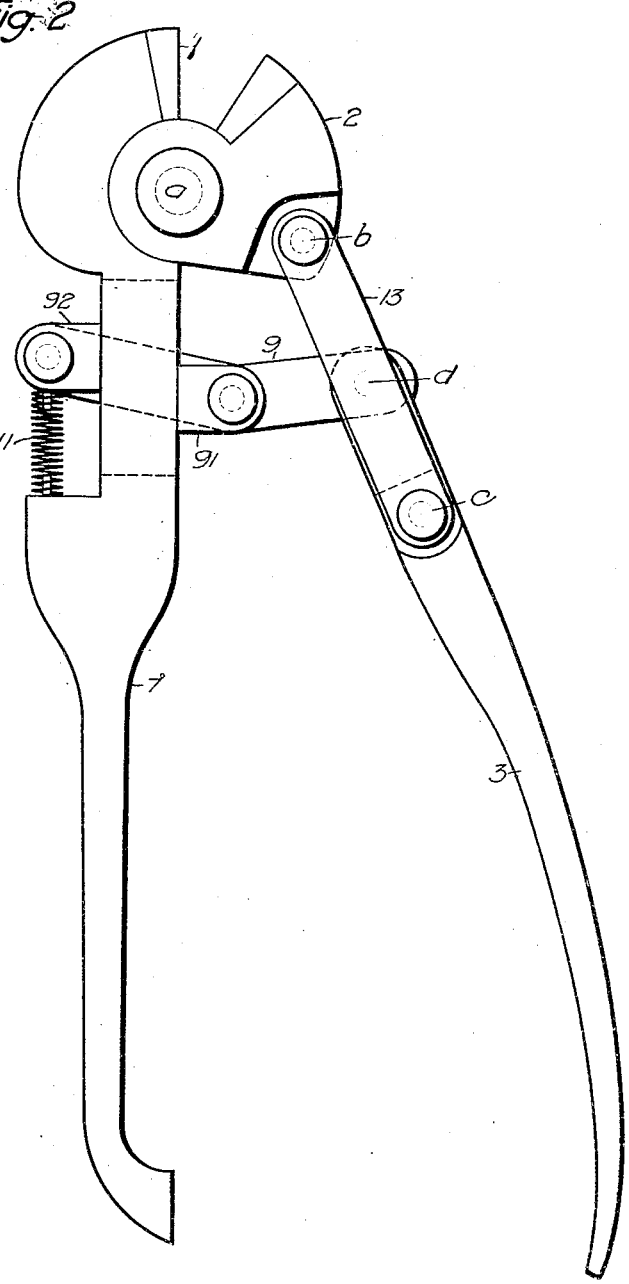

In Figs. 1 and 2, which is allied to the form shown in Figs. 2-4 of the prior application, the support 9 is pivotally connected to the upper shank 3 which is here connected to the upper jaw 2 by means of a link 13. This link is shown double though it may be simple if preferred.

The front end of shank 3 is shown forked and the upper end of the support is placed between the prongs so that both ends of the pivot $d$ are supported. The lower end of the support is guided in a slot in the lower shank 7 and engages the shank by means of two pair of studs 91, 92 which are pivoted to the support as shown though they may be rigid if preferred. Or the support may have an opening so as to embrace the shank.

In Figs. 3 and 4 the movable support consists of an eccentric 5. In the present form, this eccentric is pivoted to the upper handle 3 and engages a link 4 connected to the upper jaw. The rear end of said link is guided by a bolt 42 which may be fixed to the link so as to slide in a slot 43 in the shank 3 or vice versa.

Sufficient friction between the eccentric and the link is obtained, if the contact faces are wedge-shaped or rifled, the one fitting in the other, as shown.

The spring 4 which connects the link with the eccentric tends to turn the latter so as to keep it in contact with the link. The upper shank is pivoted to the lower shank (at $c$).

In Figs. 5, 6, 7 the movable support engaging the link 4 consists of a nut 31 screwed on the upper shank 3 which nut is turned (by spring power or manually) each time the handles are being opened. The upper shank is pivoted to the lower shank at $d$ either direct or by means of a link 13. The pivot $c$ which connects the shank 3 to link 13 is also connected to a strap 19 which embraces the other link 4 so as to prevent bending of the shank when closing the handles.

It is obvious that parts 3 and 31 may interchange, *id est* the upper shank may be a nut and the movable support may be a screw if preferred.

For rapid unscrewing of nut 31 when the jaws 1, 2 should be opened, a crank $v$ preferably pivoted as shown may be provided on the nut.

The rear end of link 4 may be made in two parts fixed together so as to engage a neck of the nut as shown.

In Fig. 8 a screw and nut are also used but one of them is connected to the upper shank 3 and the other to the lower shank 7 more direct. In the form shown the screw is swingably (not rotatively) connected to upper shank 3 (at c), while the nut 74 is both rotatively and swingably connected to the lower shank (at d).

The connection between nut and shank 7 is shown effected by a ball 71 having bearing in the shank and having an integral cylindric shaft 72, which is slidable and rotatable in the tubular screw. An annular flange 73 on shaft 72 is fixed to nut 74. A spring 75 passed on shaft 72 and engaging shank 7 and nut 74 tends to rotate the nut so as to increase the distance between c and d.

In order to prevent relative turning of screw and nut when the shanks are being closed, the threads on both are conical as shown. The conical faces are adapted to take up the pressure when closing the shanks and will then act just as a friction clutch.

In all instances the points b, c, d, lie on or near a right line, which is perpendicular or about so to a right line from b to a.

The forms shown and described should be considered as examples only and the invention thus will comprise also other modifications for instance the following ones.

Referring to Fig. 9, which is a cross section of Figs. 2–3 of my prior application through or near the point, where the support 9 is connected to link 13, said link has there a lateral position with regard to the upper shank 3, resulting in an oblique shape of the support 9. Preferably, however, the support 9 should be straight or central as seen from behind. For this purpose the upper shank 3 may be forked and the link 13 may be placed between the prongs as shown in Fig. 10. And instead of using a hook-shaped link I can make it fork-shaped or double and connect it to the support 9 by means of a separate pin as shown in Fig. 11.

Instead of using only one screw as shown in Fig. 8 I may use two swingable screws, one being connected to shank 3, the other to shank 7 and one of them being left-handed. These screws should then engage a common nut, one half of which should be left-handed.

If in Fig. 6 the joint c be omitted and the upper shank 3 be pivoted direct to the lower shank (at d), there must be a swingable connection between the nut 31 and the link 4, (for instance as shown in Figs. 14, 15, 16) or the link may be in two parts pivoted together. For instance the lower part embracing the neck of the nut may be made apart and connected to the rest of link 4 by means of a pin or pivot 46 substituting the screw 44. (See Figs. 12, 13.)

I claim:

A pair of shears comprising a lever having a jaw at one end, a second jaw pivotally connected to and carried by the first named jaw, a second lever pivotally connected to the first named lever, a movable supporting element on said second lever, and a link connected to said supporting element and also pivotally connected with said second jaw.

IVAR HULTMAN.

Witnesses:
MARSJ VGEIN,
J. SARDELIUS.